(12) United States Patent
Moore et al.

(10) Patent No.: US 8,028,604 B2
(45) Date of Patent: Oct. 4, 2011

(54) METHODS AND SYSTEMS FOR TURNING ROTARY COMPONENTS WITHIN ROTARY MACHINES

(75) Inventors: Bradley Graham Moore, Greenville, SC (US); David Ray Hudnall, Simpsonville, SC (US); Bradley Miller, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1287 days.

(21) Appl. No.: 11/627,776

(22) Filed: Jan. 26, 2007

(65) Prior Publication Data

US 2008/0181761 A1   Jul. 31, 2008

(51) Int. Cl.
*F16H 37/06* (2006.01)
(52) U.S. Cl. ..................................... 74/665 F
(58) Field of Classification Search .................. None
See application file for complete search history.

(56) References Cited

U.S. PATENT DOCUMENTS

2005/0150320 A1* 7/2005 Chueh .............................. 74/354

FOREIGN PATENT DOCUMENTS

| GB | 782022 | 8/1957 |
| GB | 1204412 | 9/1970 |
| WO | WO2004083630 A2 | 9/2004 |

* cited by examiner

*Primary Examiner* — David D Le
*Assistant Examiner* — Erin D Bishop
(74) *Attorney, Agent, or Firm* — James McGinness, Esq.; Armstrong Teasdale LLP

(57) ABSTRACT

A method and apparatus of turning rotary components of a rotary machine having a brake disc includes providing a turning gear assembly. The turning gear assembly includes a gear plate, a pinion gear and a gear motor coupled to the pinion gear. The method also includes coupling the turning gear assembly within the rotary machine using the gear plate such that the pinion gear engages with the brake disc, detecting a motion of the rotary machine, and rotating the brake disc using the pinion gear based on the detected motion.

23 Claims, 5 Drawing Sheets

METHODS AND SYSTEMS FOR TURNING ROTARY COMPONENTS WITHIN ROTARY MACHINES

BACKGROUND OF THE INVENTION

This invention relates generally to rotary machines and more particularly, to methods and systems for turning rotary components within wind turbine nacelles.

At least some known wind turbines are generally disassembled into four types of components such as, but not limited to, rotor blades, tower, rotor hubs, and nacelles for transportation. Some wind turbine components such as, but not limited to, the nacelles are substantially unitary precision instruments. As such, the nacelles are generally assembled at the manufacturer and remain intact during subsequent transportation.

Generally, nacelles are stored in cargo containers and/or affixed to transport structures such as, but not limited to, railroad cars, trucks and/or ships for transportation to a storage site and/or an assembly site. Moreover, at least some known nacelles may be transported using more than one different mode of transportation, for example by rail, truck, and/or ship. However, such nacelles may be damaged during transportation. For example, such nacelles may be damaged during land transportation because the nacelles may be subjected to uneven terrain, turning corners, and/or other stress and/or shock/vibration inducing conditions experienced by known land transportation vehicles. As a result, nacelle damage facilitates further damage and degrading operating performance of the damaged nacelles.

Generally, nacelles include several rotary components such as, but not limited to, gears and shafts that rotate during operation. For example, the shafts rotate in bearings and engage with the gears during operation. However, such nacelle components may be damaged during transportation and/or periods in which the nacelles are exposed to shock and vibration forces in a non-operating state. More specifically, at least some nacelle components may experience false brinelling of drivetrain bearings and/or gears as a result of such vibration forces.

At least some known methods and apparatus for assembling and transporting the nacelles attempt to reduce the impact of vibration forces experienced by the nacelles in non-operating states. For example, at least some known nacelles include lube oil pumps that circulate oil through gearboxes of the nacelles to lubricate, for example, bearings and areas between gear teeth of non-operating rotary components. At least some known nacelles also include internal and/or external auxiliary devices such as, but not limited to, energy generating devices that are used to periodically turn rotary nacelle components. Known energy generating devices such as, but not limited to, motors and/or engines are coupled to high-speed shafts that are connected to rotary nacelle components and turn such shafts via pulley systems and/or cardan shaft systems to periodically turn rotary nacelle components. Therefore, in addition to the oil pump, the auxiliary device and systems used to turn the rotary nacelle components increase costs associated with transporting the nacelles. Moreover, the periodic timing for turning the rotary nacelle components may not accurately distribute vibration forces throughout the bearings and/or gears and may increase the occurrence of false brinelling.

BRIEF DESCRIPTION OF THE INVENTION

In one aspect, a method is provided of turning rotary components of a rotary machine having a brake disc. The method includes providing a turning gear that includes a gear plate, a pinion gear and a gear motor coupled to the pinion gear. The method also includes coupling the turning gear assembly within the rotary machine using the gear plate such that the pinion gear engages with the brake disc, detecting a motion of the rotary machine, and rotating the brake disc using the pinion gear based on the detected motion.

In another aspect, a turning gear control system is provided for rotating rotary components of a rotary machine including a brake disc. The turning gear control system includes a turning gear assembly that includes a gear plate, a pinion gear and a gear motor. The gear plate couples the turning gear assembly within the rotary machine such that the pinion gear engages with the brake disc. The turning gear control system also includes a sensor configured to detect a motion of the turning gear assembly.

In another aspect, a nacelle is provided for a rotary machine. The nacelle includes a brake disc and a turning gear assembly that includes a gear plate, a pinion gear and a gear motor. The gear plate couples the turning gear assembly within the rotary machine such that the pinion gear engages with the brake disc. The nacelle also includes a sensor configured to detect a motion of the turning gear assembly.

In a further aspect, a turning gear assembly is provided for rotating rotary components of a rotary machine including a brake disc. The turning gear assembly includes at least one gear and a switch configured to activate the turning gear assembly such that the at least one gear engages and rotates the brake disc.

DETAILED DESCRIPTION OF THE INVENTION

The exemplary methods and apparatus described herein overcome the disadvantages of at least some known wind turbine nacelle transportation methods and systems by providing methods and systems including a motion activated drivetrain turning gear assembly.

Figure 1:
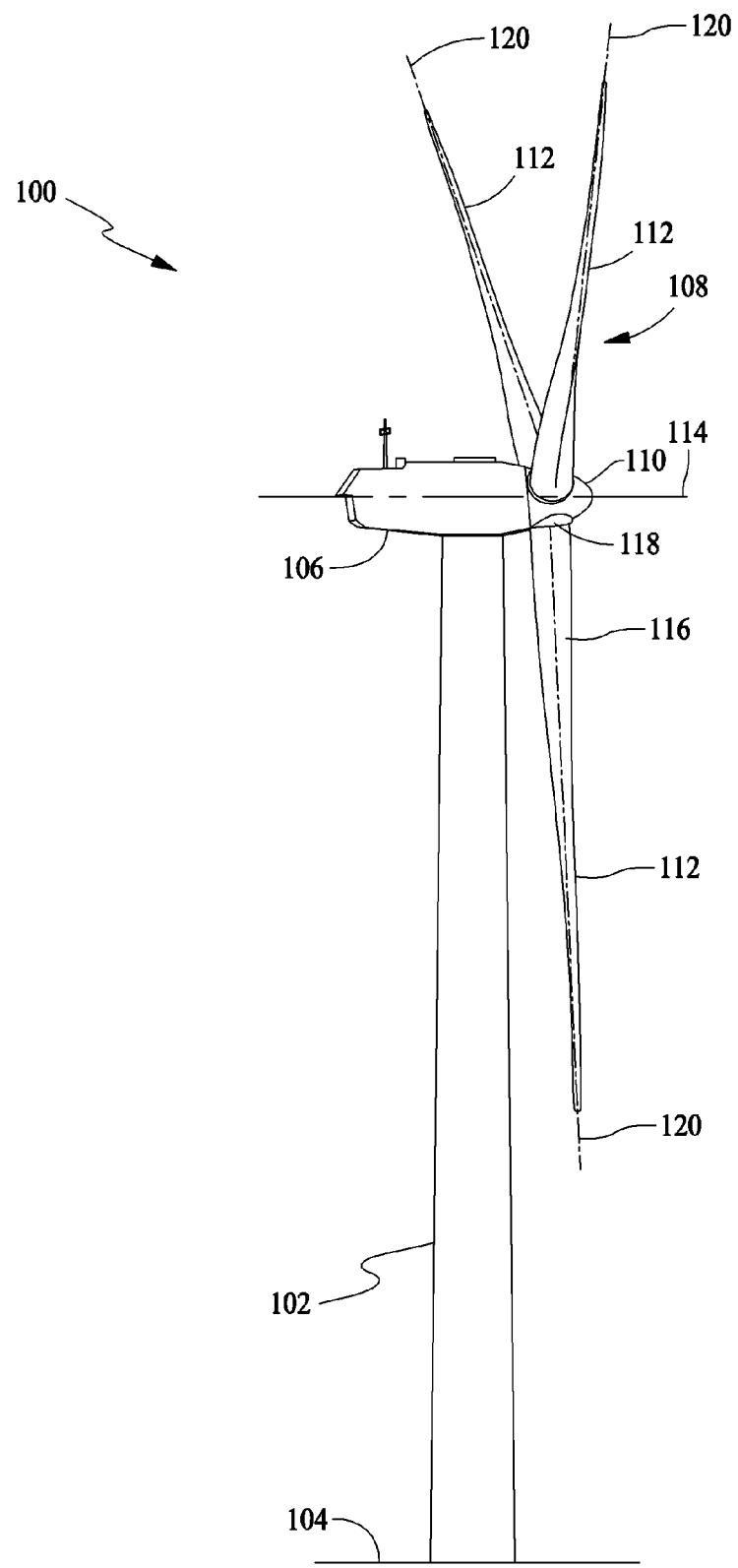
FIG. 1 is a schematic illustration of an exemplary wind turbine generator including a nacelle.

FIG. 1 is a schematic illustration of an exemplary wind turbine generator 100. In the exemplary embodiment, wind turbine 100 is a horizontal axis wind turbine. Alternatively, wind turbine 100 may be a vertical axis wind turbine. Wind turbine 100 includes a tower 102 erected on a supporting surface 104, a nacelle 106 coupled to tower 102, and a rotor 108 coupled to nacelle 106. Rotor 108 includes a rotatable hub 110 and a plurality of rotor blades ("blades") 112 coupled to hub 110. In the exemplary embodiment, tower 102 is fabricated from tubular steel including a cavity (not shown) extending between supporting surface 104 and nacelle 106. In an alternative embodiment, tower 102 is a lattice tower. The height of tower 102 is selected based upon factors and conditions known in the art. In the exemplary embodiment, rotor 108 includes three blades 112. In an alternative embodiment, rotor 108 may include more or less than three blades 112.

In the exemplary embodiment, blades 112 are positioned about rotor hub 110 to facilitate rotating rotor 108 about a central rotational axis 114 to transfer kinetic energy from the wind into usable mechanical energy, and subsequently, electrical energy. More specifically, blades 112 are mated to hub 110 by coupling a blade root portion 116 of each blade 112 to a plurality of load transfer regions 118 on hub 110. Load transfer regions 118 include a hub load transfer region (not shown) and a blade load transfer region (not shown).

As the wind strikes blades 112, rotor 108 is rotated about rotation axis 114 to transfer wind energy to nacelle 106. Pitch angles of blades 112, i.e., the angle that determines the perspective of blades 112 with respect to the direction of the wind, may be changed by a pitch adjustment mechanism (not shown in FIG. 1) to facilitate increasing or decreasing blade speed by adjusting the surface area of blades 112 exposed to the wind force vectors. FIG. 1 also illustrates a pitch axis 120 for each of blades 112.

Figure 2:
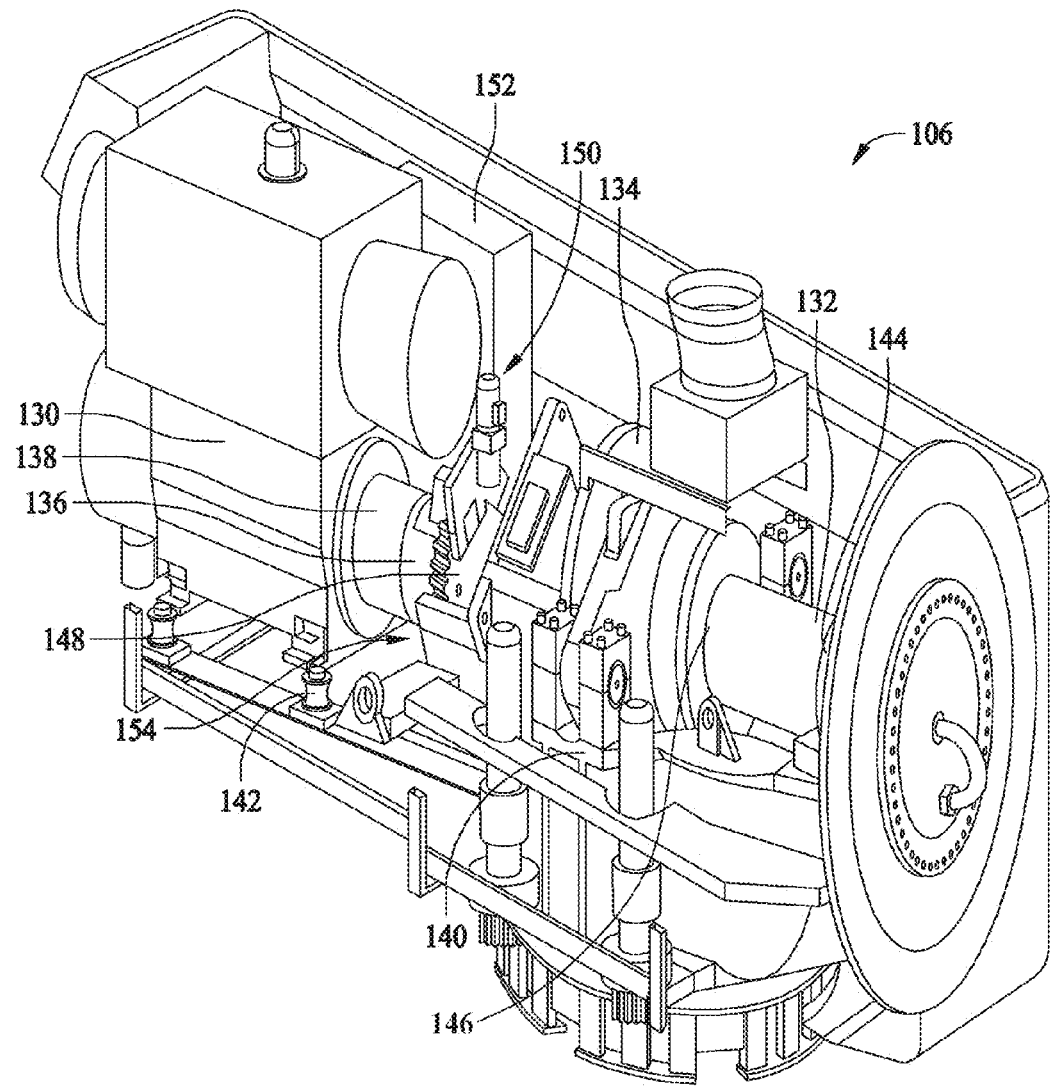
FIG. 2 is a fragmentary cross-sectional schematic view of the nacelle shown in FIG. 1.

FIG. 2 is a fragmentary cross-sectional schematic view of nacelle 106 of exemplary wind turbine 100. Various components of wind turbine 100 are housed in nacelle 106 atop tower 102 of wind turbine 100. Rotor 108 (shown in FIG. 1) is rotatably coupled to an electric generator 130 positioned within nacelle 106 via rotor shaft 132, sometimes referred to as a low-speed shaft, a gearbox 134, a high-speed shaft 136, and a coupling 138. Rotation of rotor shaft 132 rotatably drives gearbox 134 that subsequently rotatably drives high-speed shaft 136. High-speed shaft 136 rotatably drives generator 130 via coupling 138 to facilitate generating electrical power. Gearbox 134 and generator 130 are supported by supports 140 and 142, respectively. In the exemplary embodiment, gearbox 134 utilizes a dual path geometry to drive high-speed shaft 136. Alternatively, main rotor shaft 132 is coupled directly to generator 130 via coupling 138.

Moreover, forward and aft support bearings 144 and 146, respectively, are positioned within and are supported by nacelle 106. Bearings 144 and 146 facilitate radial support and alignment of rotor shaft 132. A brake disc 148 and a brake caliper 150 are positioned within and are supported by nacelle 106 to facilitate controlling rotation of rotary nacelle components. Moreover, a portion of the wind turbine control system resides within control panel 152 to facilitate controlling nacelle operations and rotary nacelle component rotation. Furthermore, in the exemplary embodiment, a turning gear assembly 154 is positioned between gearbox 134 and coupling 138 to facilitate controlling rotation of rotary nacelle components.

Figure 3:
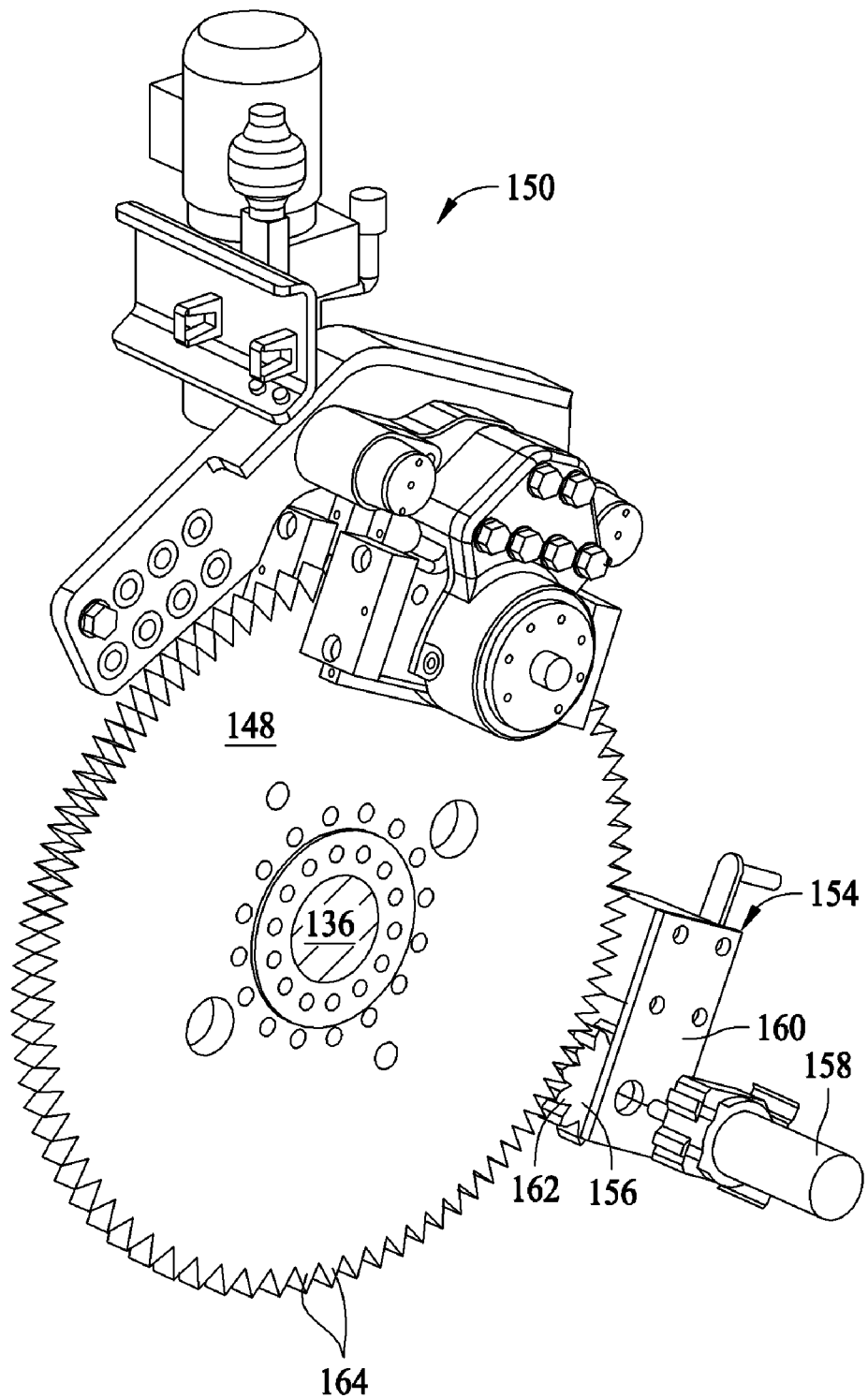
FIG. 3 is a perspective view of a turning gear assembly shown in FIG. 2.

FIG. 3 is a perspective view of turning gear assembly 154 of nacelle 106 (shown in FIGS. 1 and 2). In the exemplary embodiment, turning gear assembly 154 includes a pinion gear 156, a direct current (DC) gear motor 158, and a gear plate 160. Pinion gear 156 and gear motor 158 are coupled on opposite sides of gear plate 160. Moreover, turning gear assembly 154 is coupled within nacelle 106 such that teeth 162 of pinion gear 156 operatively engage teeth 164 of brake disc 148 that is mounted on high-speed shaft 136. In the exemplary embodiment, brake disc 148 includes eighty-nine teeth 162 and pinion gear 156 includes twelve teeth. However, it should be appreciated that brake disc 148 and pinion gear 156 may include any number of teeth that allow brake disc 148 and pinion gear 156 to engage and rotate with respect to each other.

Figure 4:
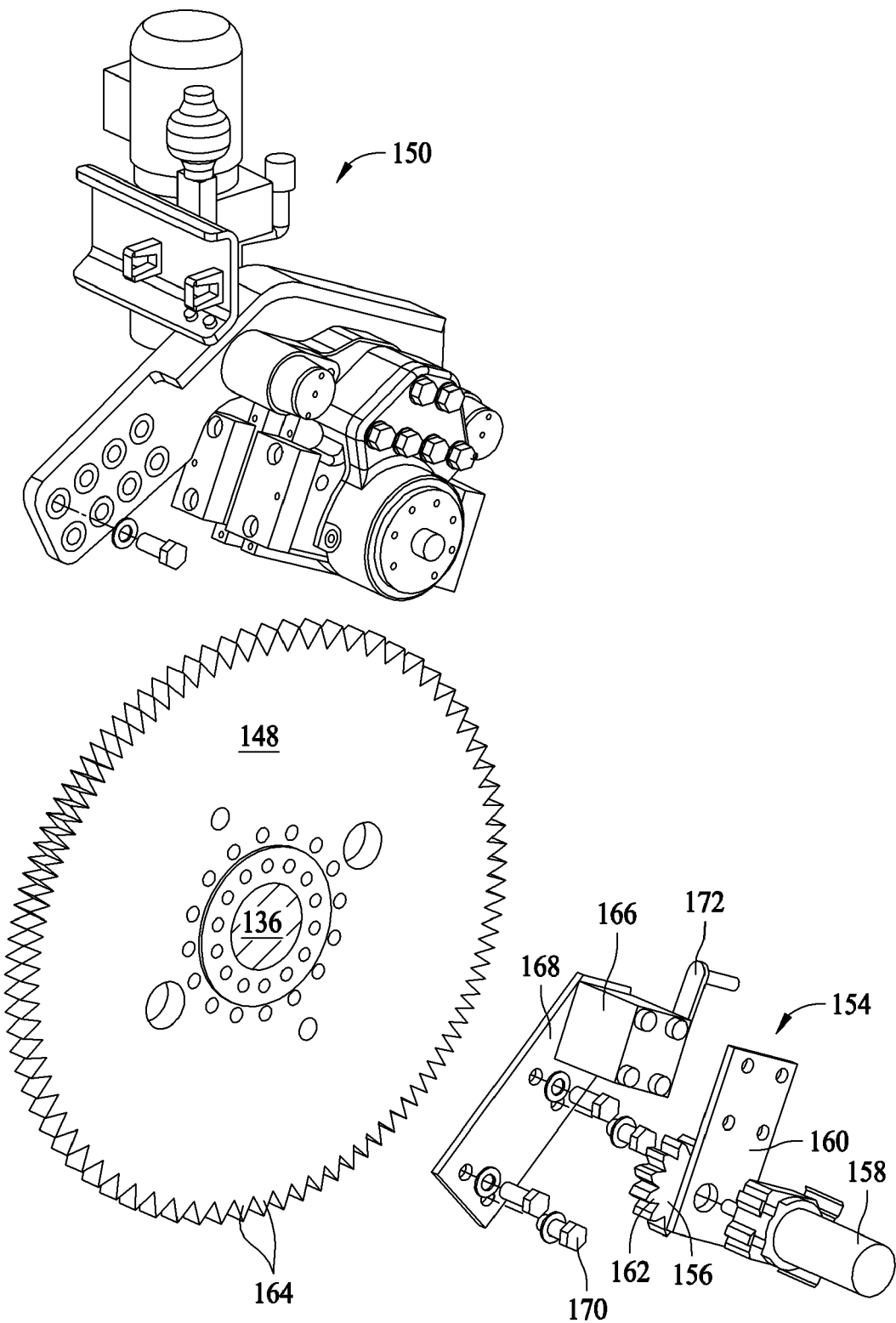
FIG. 4 is an exploded view of the turning gear assembly shown in FIGS. 2 and 3.

FIG. 4 is an exploded view of turning gear assembly 154. In the exemplary embodiment, turning gear assembly 154 is removably attached to a housing of gearbox 134 and/or another portion within nacelle 106 (shown in FIGS. 1 and 2). For example, turning gear assembly 154 may be removably attached to a rotor lock storage unit 166 positioned adjacent brake disc 148. Lock storage unit 166 is coupled to gearbox 134 via a fixing plate 168 and fasteners 170. In the exemplary embodiment, lock storage unit 166 includes a handle 172 and a lock (not shown) having gear teeth. During nacelle 106 operation, lock gear teeth operatively engage/disengage brake disc 148 to facilitate controlling rotation of brake disc 148. However, during transportation, the lock is configured to be removed and replaced with turning gear assembly 154.

After nacelle 106 has been fully assembled, turning gear assembly 154 is removably coupled to nacelle 106 such that teeth 162 of pinion gear 156 directly engage with teeth 164 of brake disc 148. Because brake disc 148 may be turned without removing production coupling 138 and/or adding additional components between generator 130 and gearbox 134, turning gear assembly 154 facilitates reducing costs associated with turning the drivetrains (not shown).

Figure 5:
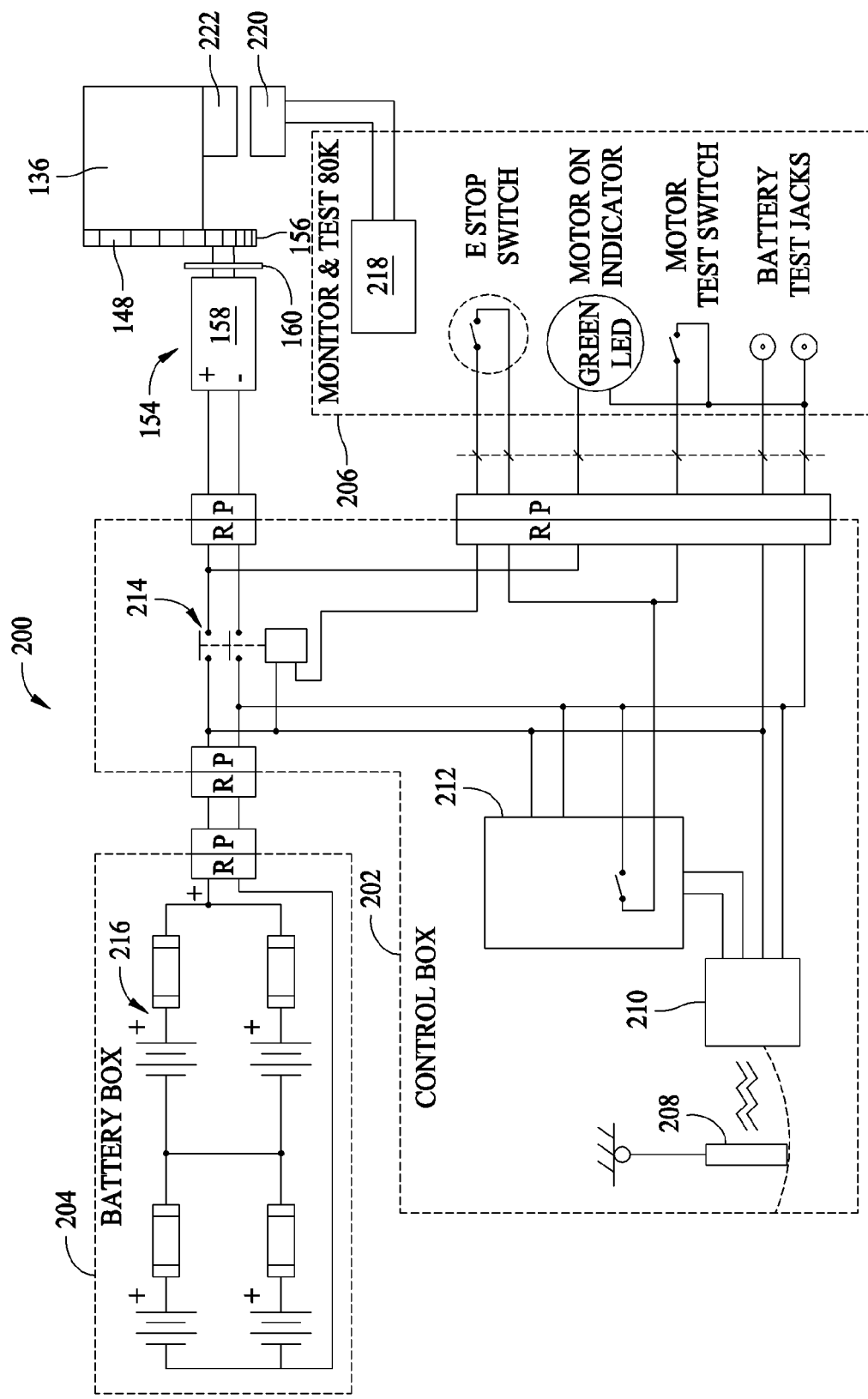
FIG. 5 is schematic illustration of a circuit diagram of an exemplary motion activated turning gear control system.

FIG. 5 is schematic illustration of a circuit diagram of an exemplary motion activated turning gear control system 200. In addition to turning gear assembly 154, turning gear control system 200 includes a control box 202, a battery box 204, and a monitor and test box 206. Although control box 202, battery box 204, and monitor and test box 206 are illustrated as individual boxes, it should be appreciated that each box may represent a subsection located within a power box assembly (not shown) that may be coupled to a railcar deck, truck bed, or other transportation platforms (not shown) in which nacelle 106 may be mounted. Although the exemplary embodiments described herein may be described in reference to transportation platforms, it should be appreciated that the exemplary methods and systems are also applicable to other nacelle 106 mounted platforms that may experience vibrations when nacelle 106 is not in operation.

In the exemplary embodiment, control box 202 includes a pendulum 208, an infrared proximity sensor 210, and a count down delay relay 212. Pendulum 208 is coupled to a housing (not shown) of control box 202 such that pendulum 208 is fixed at one end and free to swing at an opposite end. During transportation of nacelle 106, vibrations experienced by the transportation platform (not shown) are transferred to nacelle 106 and control box 202 that are each mounted on the transportation platform (not shown). As a result, the free end of pendulum 208 may be displaced with respect to infrared proximity sensor 210 that is configured to detect a motion of pendulum 208, which swings back and forth into the sensor beam. Although control box 202 includes infrared proximity sensor 210, it should be appreciated that other motion sensors may be used to sense movement of pendulum 208.

Upon detection of pendulum motion, infrared proximity sensor 210 sends a signal to relay 212, which triggers power to gear motor 158 of turning gear assembly 154. Relay 212 then begins counting down and opens power relays 214 to allow current to flow from batteries 216, which are positioned in battery box 204, to gear motor 158. As a result, gear motor 158 draws power from batteries 216 to turn brake disc 148 via pinion gear 156. Turning of brake disc 148 via pinion gear 156 facilitates turning a drivetrain (not shown) on high-speed shaft 136 at approximately 2 rpm and turning a drivetrain (not shown) on rotor shaft 132 at approximately 1½ rph.

As long as the pendulum is in motion, delay relay 212 is continuously reset. If pendulum 208 motion stops, delay relay 212 begins to time out. If there is no change in state of pendulum 208 motion, delay relay 212 closes power relays 214 so no power is available to gear motor 158. However, if pendulum 208 moves again, infrared proximity sensor 210 sends a signal to delay relay 212 to start counting down and opens power relays 214 to allow current to flow from batteries 216 to gear motor 158. In one embodiment, turning gear control system 200 includes a dry contact sensor (not shown) and another delay relay (not shown) for redundancy.

In the exemplary embodiment, monitor and test box 206 includes a counter 218 that interacts with a second proximity sensor 220 associated with a permanent magnet 222 that is coupled to high-speed shaft 136. Counter 218 is configured to count the number of revolutions of high-speed shaft 136 to facilitate verifying that brake disc 148 and high-speed shaft 136 are turning. In one embodiment, an hour meter (not shown) is used to detect the amount of time that high-speed shaft 136 is in operation to facilitate verifying that brake disc 148 and high-speed shaft 136 are turning.

In the exemplary embodiment, turning gear control system 200 is motion activated. As a result, turning gear control system 200 facilitates distributing vibration forces throughout gears and/or bearings, and thus facilitates reducing false brinelling. For example, and in one embodiment, turning gear control system 200 continually rotates bearing 146 based on detected vibrations to substantially distribute vibration forces over bearing 146 such that the vibration forces do not continually impact one portion of bearing 146. As a result, turning gear control system 200 facilitates reducing false brinelling. Moreover, battery powered turning gear control system 200 facilitates reducing costs associated with providing power to turn drivetrains (not shown) within nacelle 106 as compared to known turning systems.

The exemplary methods, apparatus and systems for turning rotary components within a wind turbine generator nacelle described herein facilitate reducing impact of vibration forces such as false brinelling. More specifically, the turning gear control systems described above facilitates distributing vibration forces over rotary components as compared to one portion of the rotary component. As a result, such turning gear control systems facilitate increasing component life and/or reducing overall maintenance costs of the nacelles.

Exemplary embodiments of methods, apparatus, and systems for turning rotary components within wind turbine generator nacelles are described in detail above. The methods, apparatus and systems are not limited to the specific embodiments described herein or to the specific illustrated wind turbine generator nacelles.

While the invention has been described in terms of various specific embodiments, those skilled in the art will recognize that the invention can be practiced with modification within the spirit and scope of the claims.

What is claimed is:

1. A method of turning rotary components of a rotary machine including a brake disc, said method comprising:
   providing a turning gear assembly comprising a gear plate, a pinion gear and a gear motor, the gear motor coupled to the pinion gear;
   coupling the turning gear assembly within the rotary machine using the gear plate such that the pinion gear engages with the brake disc;
   detecting a motion of the rotary machine;
   rotating the brake disc using the pinion gear based on the detected motion; and
   transferring energy to the gear motor based on the detected motion.

2. A method according to claim 1 wherein detecting a motion of the rotary machine comprises sensing a motion of a pendulum.

3. A method according to claim 2 wherein sensing a motion of a pendulum comprises sensing a pendulum motion with a proximity sensor.

4. A method according to claim 1 further comprising triggering a count down relay to open a power relay based on the detected motion.

5. A method according to claim 1 wherein detecting a motion comprises detecting a vibration.

6. A turning gear control system for rotating rotary components of a rotary machine including a brake disc, said turning gear control system comprising:
   a turning gear assembly comprising a gear plate, a pinion gear and a gear motor, said gear plate coupling said turning gear assembly within said rotary machine such that said pinion gear engages with said brake disc;
   a sensor configured to detect a motion of said turning gear assembly; and
   a power source configured to transfer energy to said gear motor based on the detected motion.

7. A system according to claim 6 wherein said pinion gear is configured to rotate said brake disc based on the detected motion.

8. A system according to claim 6 further comprising a pendulum configured to move in response to motions experienced by said turning gear assembly.

9. A system according to claim 8 wherein said sensor is a proximity sensor configured to sense a motion of said pendulum.

10. A system according to claim 6 wherein said sensor is a proximity sensor.

11. A system according to claim 6 further comprising a count down relay configured to trigger a power relay to open based on the detected motion such that energy is transferred to said gear motor.

12. A system according to claim 6 wherein said sensor is configured to detect a vibration of said turning gear assembly.

13. A nacelle for a rotary machine comprising:
    a brake disc;
    a turning gear assembly comprising a gear plate, a pinion gear and a gear motor, said gear plate coupling said turning gear assembly coupled within said rotary machine such that said pinion gear engages with said brake disc;
    a sensor configured to detect a motion of said turning gear assembly; and
    a power source configured to transfer energy to said gear motor based on the detected motion.

14. A nacelle according to claim 13 wherein said pinion gear is configured to rotate said brake disc based on the detected motion.

15. A nacelle according to claim 13 further comprising a pendulum configured to move in response to motions experienced by said turning gear assembly.

16. A nacelle according to claim 15 wherein said sensor is a proximity sensor configured to sense a motion of said pendulum.

17. A nacelle according to claim 13 wherein said sensor is a proximity sensor.

18. A nacelle according to claim 13 further comprising a count down relay configured to trigger a power relay to open based on the detected motion such that energy is transferred to said gear motor.

19. A nacelle according to claim 13 wherein said sensor is configured to detect a vibration of said turning gear assembly.

20. A turning gear assembly for rotating rotary components of a rotary machine including a brake disc, said turning gear assembly comprising:

at least one gear; and a switch comprising a motion sensor configured to detect a motion of said turning gear assembly and comprising a power relay configured to be activated based on the detected motion and configured to activate said turning gear assembly such that said at least one gear engages and rotates the brake disc.

21. A turning gear assembly according to claim 20 wherein said at least one gear is configured to rotate said brake disc based on the detected motion.

22. A turning gear assembly according to claim 20 further comprising a pendulum configured to move in response to motions experienced by said turning gear assembly.

23. A turning gear assembly according to claim 22 wherein said switch comprises a motion sensor configured to detect a motion of said pendulum.

* * * * *